United States Patent
Caporali

(10) Patent No.: US 7,642,956 B2
(45) Date of Patent: Jan. 5, 2010

(54) SYSTEM AND METHOD FOR MONITORING AND SURVEYING MOVEMENTS OF THE TERRAIN, LARGE INFRASTRUCTURES AND CIVIL BUILDING WORKS IN GENERAL, BASED UPON THE SIGNALS TRANSMITTED BY THE GPS NAVIGATION SATELLITE SYSTEM

(75) Inventor: Alessandro Caporali, Este (IT)

(73) Assignee: SEPA-Sistemi Elettronici per Automazione S.p.A., Turin (IT)

( * ) Notice: Subject to any disclaimer, the term of this patent is extended or adjusted under 35 U.S.C. 154(b) by 25 days.

(21) Appl. No.: 11/815,589

(22) PCT Filed: Jan. 27, 2006

(86) PCT No.: PCT/IB2006/000303

§ 371 (c)(1),
(2), (4) Date: Dec. 20, 2007

(87) PCT Pub. No.: WO2006/082520

PCT Pub. Date: Aug. 10, 2006

(65) Prior Publication Data

US 2008/0204315 A1 Aug. 28, 2008

(30) Foreign Application Priority Data

Feb. 4, 2005 (IT) .......................... TO2005A0065

(51) Int. Cl.
*G01S 1/02* (2006.01)
*G01S 5/14* (2006.01)
(52) U.S. Cl. ............................ 342/357.06; 342/357.12; 342/357.17; 701/213

(58) Field of Classification Search ............ 342/357.06, 342/357.07, 357.09, 357.12, 357.13, 357.17; 701/213, 215
See application file for complete search history.

(56) References Cited

U.S. PATENT DOCUMENTS

2002/0107636 A1   8/2002   Ford et al.
2004/0130485 A1   7/2004   Rapoport et al.

FOREIGN PATENT DOCUMENTS

WO         02063328 A      8/2002

OTHER PUBLICATIONS

International Search Report dated Oct. 18, 2006 for PCT/IB2006/000303.
International Preliminary Report on Patentability dated Mar. 19, 2007 for PCT/IB2006/000303.
Written Opinion of the International Searching Authority dated Oct. 18, 2006 for PBT/IB2006/000303.

*Primary Examiner*—Dao L Phan
(74) *Attorney, Agent, or Firm*—Heslin Rothenberg Farley & Mesiti P.C.

(57) ABSTRACT

A measurement system for applications of monitoring and surveying based upon the signals transmitted by a GPS system includes a plurality of measurement stations equipped with at least one GPS receiver, one or more base stations for reception and processing of the measurements made by the plurality of measurement stations, and a network of communication between the stations. The GPS receiver is a receiver that works on a single carrier. The measurement stations are split into triangular sub-networks in which each vertex of a triangle contains a station. The base station is configured for calculating lengths of the baselines that join the measurement stations by means of the double differences, and the base station is configured for executing calculation of the solution in real time.

5 Claims, 4 Drawing Sheets

SYSTEM AND METHOD FOR MONITORING AND SURVEYING MOVEMENTS OF THE TERRAIN, LARGE INFRASTRUCTURES AND CIVIL BUILDING WORKS IN GENERAL, BASED UPON THE SIGNALS TRANSMITTED BY THE GPS NAVIGATION SATELLITE SYSTEM

CROSS REFERENCE TO RELATED APPLICATIONS

This application is a 371 national stage filing of PCT International Application No. PCT/IB2006/000303, filed on Jan. 27, 2006, and published in English on Aug. 10, 2006 as WO 2006/082520 A2, which claims priority to Italian Patent Application No. TO2005A000065 filed on Feb. 4, 2005, the entire disclosures of which are incorporated herein by reference.

FIELD OF THE INVENTION

The present invention relates in general to measurement systems based upon signals transmitted by the navigation satellite system GPS (Global Positioning System), in particular for applications of monitoring and surveying of the displacements and deformations of the territory (landslides, landslips, natural movements of the terrain, etc.) and of buildings, dams, bridges, roads, large infrastructures, and civil building works in general.

SUMMARY OF THE INVENTION

The systems for monitoring the territory and large infrastructures have exploited the techniques developed for geodetic applications, with the result that relatively costly receivers, originally developed for scientific applications, are at the moment ordinarily used for activities of civil engineering and monitoring of the territory and of infrastructures.

The consequence is that measurement systems based upon the signals transmitted by the GPS system have a limit of diffusion and use due to the high cost of the equipment employed.

Currently, the measurements are made by means of transportable stations, which at the end of the measurement cycle are displaced and used for monitoring works in a site different from the one just monitored. The reduction in the costs of the measurement systems would enable the creation of fixed networks of measurement stations that would provide a complete analysis in space and time of the phenomena monitored.

More in particular, the invention relates to a measurement system for applications of monitoring and surveying based upon the signals transmitted by the GPS system, of the type comprising:

a plurality of measurement stations equipped with at least one GPS receiver;
one or more base stations for the reception and processing of the measurements made by said plurality of measurement stations; and
a network for communication between said stations.

The object of the invention is thus to provide a measurement system for applications of monitoring and surveying based upon the signals transmitted by the GPS system that will enable reduction of the cost of the equipment required, making possible the provision of fixed monitoring networks for real-time applications.

According to the invention, the above purpose is achieved thanks to a measurement system for monitoring and surveying applications based upon the signals transmitted by the GPS system of the type specified above, basically characterized in that:

the GPS receiver is a receiver that works on a single carrier;
the measurement stations are split into triangular sub-networks in which each vertex of the triangle contains a station;
the base station is configured for calculating the length of the baselines that join the measurement stations by means of the double differences; and
said base station is configured for executing the calculation of the solution in real time.

In a preferred embodiment of the invention the receivers used in the measurement stations are low-cost receivers that work on a single carrier.

In a further preferred embodiment, the real-time communications between the measurement stations are obtained by means of low-cost Wireless Local Area Networks (WLANs) or by means of point-to-point radio connections that use modems operating in the 2.4-GHz bandwidth.

The measurement system for monitoring and surveying applications based upon the signals transmitted by the GPS system according to the invention, which as already said is particularly designed for applications of monitoring and surveying of the displacements and deformations of large infrastructures and civil building works in general, is able to reduce the costs of the necessary equipment and enable a large-scale diffusion of these measurement systems for the purpose of monitoring and protecting the immediate environment in a constant and continuous way.

In the past, the above measurement systems were the exclusive prerogative of scientific or sensitive applications, but in future it is thinkable that a capacity for monitoring and detection will be integrated within the infrastructure itself. This can be made possible only by low-cost systems.

Today, measurement systems for geodetic applications are still based upon the a posteriori processing, or post-processing, of the data on account of the complexity of the algorithms of calculation of the solutions and of the limited capacities of the computers available. Since the computing power has, today, made enormous headway, it has rendered possible real-time applications for which there is the requirement of ensuring reliability and rapidity of system response.

Whilst a scientific application can accept a delay in processing of the data, an integrated system for monitoring an infrastructure must be able to respond rapidly and reliably in all the conditions to which it is subjected.

The solution according to the invention is able to ensure an extensive diffusion of measurement systems, comparable to the current diffusion of cellphones and of satellite navigators, thanks to the following advantageous effects:

low cost, for enabling diffusion of fixed monitoring networks;
high speed in the measurement operations;
real-time processing of the data at the same rate as that of the measurement operations; and
real-time communications for enabling storing and sharing of the data in the various measurement stations.

BRIEF DESCRIPTION OF THE DRAWINGS

The invention will now be described in detail with reference to the enclosed figures of drawings, which are provided purely by way of non-limiting example only, and in which.

DETAILED DESCRIPTION OF THE INVENTION

Figure 1:
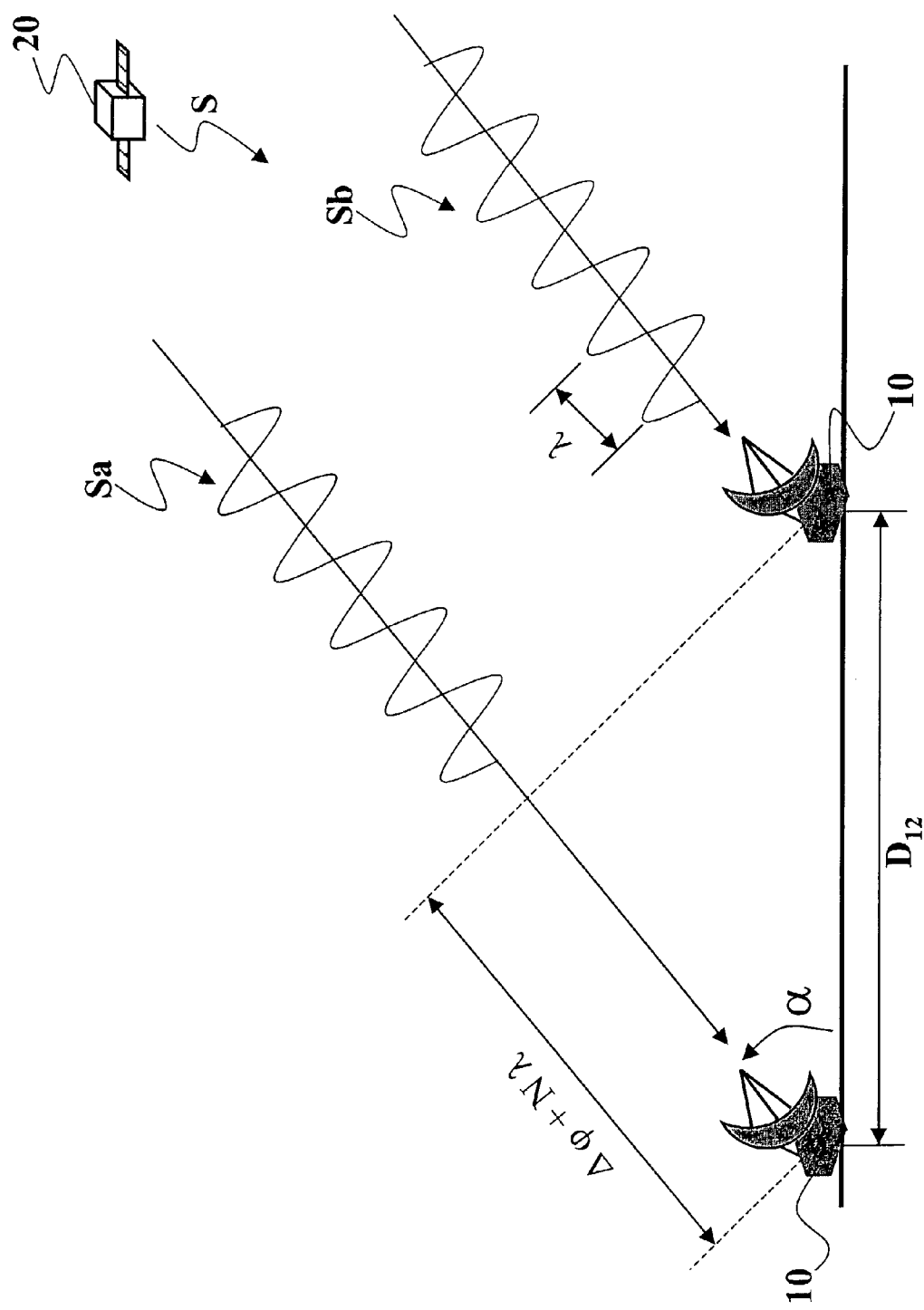
FIG. 1 shows the basic principle of interferometric surveying.

The principle underlying interferometric surveying, which is the fundamental technique of the geodetic applications that exploit measurements made by means of satellite signals, is illustrated in FIG. 1.

With reference to FIG. 1, two antennas 10 set in different positions receive a signal S transmitted by a satellite 20 in view. Let the distance between the two antennas 10 be designated by $D_{12}$; this distance $D_{12}$ is commonly indicated as "baseline" between the two antennas and can be calculated geometrically using the following formula:

$$D_{12} = \frac{\Delta\varphi + N \cdot \lambda}{\cos\alpha}$$

where $\lambda$ is the wavelength, $\Delta\phi$ is the precision of the measurements, and $\alpha$ is the angle of elevation of the satellite 20.

The measurement obtained from the satellite signals gives the relative distance between the two antennas 10, estimating the length of the baseline $D_{12}$. Since the two distances between the antennas 10 and the satellite 20 are generally much larger than the length of the baseline $D_{12}$, it may be assumed that the signal S transmitted by the satellite 20, and simultaneously received by the two antennas 10, can be assimilated to a plane wave front.

The phase difference between the two signals Sa and Sb received by the antennas 10 is given by Eq. (1):

$$\Delta\phi = \Delta\varphi + N \cdot \lambda \qquad (1)$$

where $\Delta\varphi$ is the difference (unknown) of the paths of propagation between the satellite and the two antennas 10, $\Delta\phi$ is the electrical phase difference measured, and $N \cdot \lambda$ is an integer number of wavelengths used for calculating the geometrical distance $\Delta\varphi$ for a particular elevation $\alpha$ of the satellite 20 with respect to $D_{12}$.

For the particular case of the satellites belonging to the GPS system, the carrier frequency of the signals transmitted is in the bandwidth L, namely 1575 MHz, corresponding to a wavelength of $\lambda \approx 19$ cm.

In these conditions, there is a precision of the measurements in the region of 5 mm. The satellites of the GPS system transmit their signals on two different carriers, L1 and L2, which are both in the bandwidth L.

The resolution of the ambiguity inherent in the periodic nature of the non-modulated signals, which is obtained with tracking of the phase of the carrier, represents the biggest challenge for calculation of the length of the baseline $D_{12}$.

In the system according to the present invention the receivers used in the measurement stations work on a single carrier, and more in particular on the carrier L1.

The absence of the second carrier L2 prevents the use of a technique for resolution of the carrier, which employs a fictitious signal, obtained via the difference of the carriers L1 and L2, which supplies a fictitious carrier at approximately 384 MHz, equivalent to a wavelength $\lambda$ of approximately 86 cm.

For geodetic and monitoring applications, the constraint regarding a fixed baseline mitigates the problem, since the ambiguity can be resolved once at the start of the measurements, and the results can be used also in the subsequent measurements.

However, the errors due to temporary losses of alignment between the local code generated in the GPS receiver and the carrier of the signal transmitted by the satellites (also known as lack of locking of the carrier-tracking loop), errors caused by sudden ionospheric dispersion (scintillations) or phase errors caused by malfunctioning in the oscillators of the transmitters of the satellites call for a continuous control of ambiguity in order to prevent, in the solution of the measurement of the phase difference $\Delta\phi$ between the two signals, errors such as an integer number of wavelengths from appearing. The intention is moreover to prevent said errors from in turn possibly generating further errors in the evaluation of the length $D_{12}$ of the baseline.

The physical measurement of $\Delta\phi$ is, instead, preferably linked to the received power of the signal, to the thermal noise, to the noise figure of the antenna and of the receiver, to the bandwidth of the carrier-phase-locked loop in the receiver (as likewise to the implementation of the loop, and to the equivalent noise bandwidth) and to the stability in frequency of the local oscillator within the GPS receiver.

Taking into account all of the above parameters, a typical modern receiver is able to recover the phase of a carrier that has superimposed a noise with a mean square error of 5 mm, principally thermal noise in a bandwidth of 1 Hz, which is the frequency suitable for real-time surveying applications.

The measurement is rendered more difficult by the fact that the two receivers form an interferometer with non-connected elements, where the two local oscillators are independent. There arises the need to recover the difference of phase and frequency between the two oscillators in the calculation of the value of the length of the baseline.

In general, the receivers are required to have more than one satellite in view to be able to write a system of equations, the solution of which determines all the unknown quantities present.

The navigation signals are ideal for geodetic applications in so far as they are generated by very stable sources, such as atomic clocks on board satellites (rubidium and caesium oscillators), and the position of the transmitters is known precisely.

The navigation signals are used generally for calculation of the pseudo-distances, referred to as pseudo-ranges, which derive from a Pseudo-Random Code (PRN) of limited length modulated on the carrier. The pseudo-distances represent measurements of distance based upon the correlation between the code transmitted by a satellite and the reference code generated locally within the receiver.

The spectral properties of this pseudo-random code render it the ideal code for the applications of estimation of the position of satellite-navigation receivers.

One of the problems in determination of the positions of the antennas, based upon measurements of the carrier phase, is linked to the integer number N of cycles of the carrier that contribute to the total phase $\Delta\phi$, or in other words the term $N \cdot \lambda$ in Eq. (1).

In geodetic applications, however, it is possible to exploit the fact that the antenna is quasi-static, or moves with low dynamics, in order to assume a nominal position of the antennas and hence constrain the solution with an initial uncertainty on $\Delta\phi$ not greater than $\lambda$, thus enabling an "a priori" resolution of the ambiguity.

Whilst there is always necessary a verification that said assumption is correct in processing of the data (above all, to compensate possibly for a lack of continuity in the phase measurements (cycle slip) due to the individual receiver), said assumption enables a considerable reduction in the calculation times, permitting the solution of the baselines in real time even on networks formed by a large number of individual baselines.

The solution described herein enables processing of the data on the individual baselines on the basis of an "a priori" knowledge of the nominal position of the antennas to reduce the complexity of calculation and at the same time mitigate the problems in the resolution of the ambiguity in the phase measurement linked to the fact of operating with a single carrier (L1).

The fact of assuming a nominal position of the antennas to resolve the ambiguity must not be considered a constant in the solution for an infinite time duration. It is presupposed that the antennas that make up the network are not static but move with a low dynamics, which is precisely the phenomenon that it is intended to monitor. Hence, at the distance of months or years the antennas the co-ordinates $x_i(t0)$ of which have been determined at an initial time t0 may occupy a different position $x_i(t1)$ at the time t1, where t1>t0.

It is, then, necessary to recalibrate periodically the nominal position of the antennas on time intervals of long duration, which corresponds to a periodic re-calibration of the nominal positions of the datum points of the measurement network.

Consequently, the nominal position of the antennas is considered a non-static variable, but with low dynamics, being updated occasionally or continuously, but with a time constant $\pi$ associated to the process of estimation of the nominal co-ordinates of the antennas much greater than the time constant of the phenomena to be monitored, which instead lead to deviations from the nominal position of the short-period antennas.

This enables consideration of the static network over short periods of time, and hence effective measurement of the variations of position of the antennas resulting from the phenomena to be controlled, whilst variations accumulated over long periods that could influence the determination of the ambiguity are resolved by periodic re-calibration of the nominal positions of the antennas with a much longer time constant.

The solution proposed herein envisages updating the nominal position of the antennas with a linear estimator and an associated time constant of duration longer than that of the phenomena under examination.

The measurement of the pseudo-distance based upon code measurements can be modelled as in Eq. (2):

$$\Delta R_i = \rho_i + c \cdot \Delta t_i + \Delta \rho_{iono,i} + \Delta \rho_{tropo,i} + \epsilon_i \quad (2)$$

where:
$\rho_i$ designates the distance between the i-th satellite and the receiver;
$\Delta t_i$ designates the temporal difference of synchronization between the clocks of the navigation system on board the satellites and the clock of the receiver;
$\Delta \rho_{iono,i}$ designates the additional error in the path travelled by the signal due to the ionospheric delay, and is a parameter depending upon the frequency (the ionosphere is a dispersive medium for radio-frequencies);
$\Delta \rho_{tropo,i}$ designates the additional error in the path travelled by the signal due to the tropospheric delay, and is a parameter independent of the frequency; and
$\epsilon_i$ designates the residual errors that depend upon the observation of the i-th satellite, including the errors due to the multiple paths.

Even though the measurements of the pseudo-distances are not affected by ambiguity on account of the structure of the signal (the ambiguity in the GPS system remains at the level of 1.5 s), they are limited to a level of precision of a meter by the bandwidth and by the signal-to-noise ratio (SNR). This remains true also for a system that uses the differential corrections in which the delays of propagation can be removed. These results are clearly insufficient for geodetic or high-precision surveying applications.

In this connection, the measurements made on the phase of the carrier have been chosen for the high-precision measurements.

Like the measurements of the pseudo-distances obtained from the code, the measurements of the pseudo-distances obtained from the phase of the carrier, designated by $\phi_i$ and expressed in number of cycles of the carrier, can be modelled as in Eq. (3):

$$\phi_i = \frac{\rho_i}{\lambda} + \frac{c}{\lambda} \cdot \Delta t + N_i - \frac{\Delta \rho_{iono,i}}{\lambda} + \frac{\Delta \rho_{tropo,i}}{\lambda} + \frac{\epsilon_i}{\lambda} \quad (3)$$

The negative sign of the term for ionospheric propagation is due to the fact that, in a dispersive medium, the product of the phase and the group velocity for an electromagnetic wave is $c^2$, and hence the phase travels at a speed faster than the speed of the light.

Even though the phase of the carrier provides more exact measurements, it is affected by the resolution of the ambiguity. Different techniques have been developed to overcome this problem of ambiguity, principally based upon single differences, double differences, and triple differences of the quantities observed.

From an inspection of Eq. (3), it is possible to note that making the difference between two quantities measured by two receivers, starting from the signal transmitted by the same satellite A, the terms of error that do not depend upon the satellite considered are eliminated.

It is thus possible to write a first phase difference, as illustrated in Eq. (4):

$$\Delta \phi^A = \frac{\Delta \rho^A}{\lambda} + \left[ \left( \frac{c}{\lambda} \cdot \Delta t \right)_1 - \left( \frac{c}{\lambda} \cdot \Delta t \right)_2 \right] + N^A + \frac{\epsilon^A}{\lambda} = \quad (4)$$
$$= \frac{\Delta \rho^A}{\lambda} + \left( \frac{c}{\lambda} \cdot \Delta \tau \right) + N^A + \frac{\epsilon^A}{\lambda}$$

for the new measurement, where the ionospheric and tropospheric terms of propagation have been eliminated, $\Delta \tau$ designates the instantaneous difference of synchronization between the two oscillators (clocks) present in the two receivers, $N^A$ is the integer single difference of ambiguity ($N^A = N_1 - N_2$), and $\epsilon^A$ is the residual term of noise (stochastic error and multiple paths).

Starting from Eq. (5)

$$\Delta \rho^A \vec{b} \cdot \vec{s}^A \quad (5)$$

where $\vec{b}$ is the vector of the baseline, and $\vec{s}^A$ is the unit vector of the line of slight of the satellite A, it is possible to write Eq. (6):

$$\Delta \phi^A = \frac{\vec{b} \cdot \vec{s}^A}{\lambda} + \frac{c \cdot \Delta \tau}{\lambda} + N^A + \frac{\epsilon^A}{\lambda} \quad (6)$$

The first difference still maintains the instantaneous difference of synchronization between the two oscillators of the receivers considered. This difference of synchronization can be removed via a second difference, subtracting the first differences calculated on two different satellites. Generally, the final solution calculates the double differences taking into consideration a common satellite H and calculating the double differences with each of the remaining satellites. For example, the second difference for the satellite A, with respect to the reference satellite H is given by Eq. (7):

$$\nabla \Delta \phi^{AH} = \Delta \phi^A - \Delta \phi^H = \qquad (7)$$

$$= \frac{\vec{b} \cdot \vec{s}^A}{\lambda} + \frac{c \cdot \Delta \tau}{\lambda} + N^A + \frac{\varepsilon^A}{\lambda} -$$

$$\frac{\vec{b} \cdot \vec{s}^H}{\lambda} - \frac{c \cdot \Delta \tau}{\lambda} + N^H + \frac{\varepsilon^H}{\lambda} =$$

$$= \frac{\vec{b} \cdot (\vec{s}^A - \vec{s}^H)}{\lambda} + N^{AH} + \frac{\varepsilon^{AH}}{\lambda}$$

where $N^{AH}$ designates the difference between the ambiguity for the baseline considered with respect to the two satellites A and H, and $\varepsilon^{AH}$ designates the difference between the two noise components.

The error due to the less than perfect synchronism between the oscillators of the receivers has been removed by the double difference.

In a preferred embodiment of the measurement system according to the invention, a measurement station 50 in the network is arbitrarily chosen as point of reference of the network; a set of baselines connects the reference station 50 to any other station 30, and the network assumes a star-shaped topology.

Pairs of baselines form triangular sub-networks, so that the entire network is divided up into triangular modules with an antenna for receiving the GPS signals on each vertex of the triangular module, and a vertex common to all the triangles.

Figure 2:
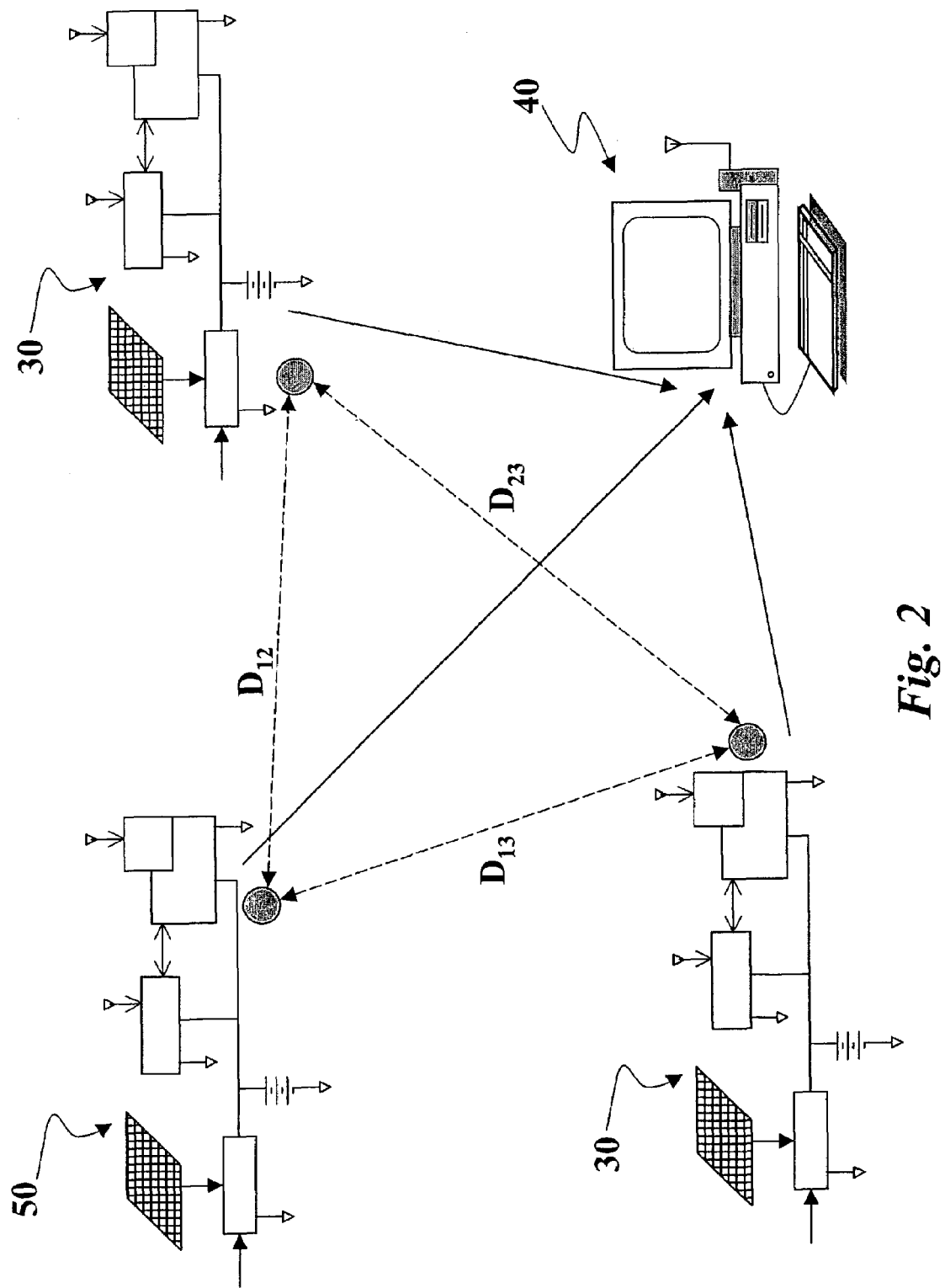
FIG. 2 shows an example of geometry of the network according to the invention.

FIG. 2 illustrates the architecture of a triangular sub-network, in which two measurement stations 30 and a reference station 50 are connected to a base station 40 for processing the data.

When this topology is extended to large areas, the sub-networks are modelled by connecting together receivers common to adjacent sub-networks.

Each elementary triangle is resolved by the combination of two single solutions of the baselines with the constraints imposed by the angles subtended.

This solution leads to the correct co-ordinates of the vertices with respect to the reference station 50 (the vertices common to the two baselines in the triangle).

Consequently, for each station 30, 50 in the network, the displacement that derives from the deformations of the geometry of the network is decomposed by projecting the solutions of the baselines in the co-ordinates of a local system of topocentric co-ordinates, i.e., in the co-ordinates East, North and in the components that are vertical with respect to the reference station 50 of the network.

If in turn this station 50 is referenced with respect to an absolute position, by introducing a surveying station into the network, then the network itself is geo-referenced in an absolute way with respect to the absolute reference position established.

The resolution of the individual baselines leads to the determination, with a good degree of accuracy, of the displacements in the direction determined by the baseline itself, i.e., the deformations in length of the baseline. In many applications it is interesting to arrive at a determination of said displacements projected on the components of a local topocentric system.

This means that the contribution of the deformations perpendicular to the baseline (both on the plane on which this lies and in a direction orthogonal to said plane) is generally less accurate than the contribution in the direction determined by the baseline itself.

In order to improve the determination linked to these components, the measurement system described herein first resolves the individual baselines and subsequently combines said solutions in a solution extended to the entire network, where this is broken down into triangular modules, each of which is constituted by two baselines and the common vertex of which is generally (but not necessarily) the reference antenna (or the receiver) of the network. In this case, it is possible to use the a priori geometrical information on the topology of the network to constrain in the solution the components perpendicular to the baselines and improve their determination.

The method proposed is clearly extendible also to the combined solution of a number of sub-networks or networks of an extensive geodetic measurement system. The speed of execution linked to the particular algorithms used enables resolution of this procedure in real time at the same frequency of sampling of the measurements and of resolution of the individual baselines. Consequently, the system effectively carries out an estimation of deformation in real time on the entire compensated network.

This method is in principle very similar to the method of adjustment of the network of the classical topography, where measurements of trilateration/triangulation between a number of datum points of a network were "closed" with the application of the criterion of estimating the parameters so as to minimize the residue of the errors on the entire network instead of on the individual measurement.

The solution described herein enables resolution of the baselines based upon triangular modules for improving a first determination of the displacements estimated along the individual baselines, using the geometrical constraints of the network to improve the estimation of the components perpendicular to the baselines and in height, and hence in general for refining the determination executed, at the same time improving its reliability.

Since the error due to the multiple paths is the principal source of errors that remains in the solution after processing, there are currently being studied techniques of mitigation in order to provide a correction that will takes into account the multiple paths to be made to the real-time solution for evaluation of the displacements of the baselines.

Figure 3:
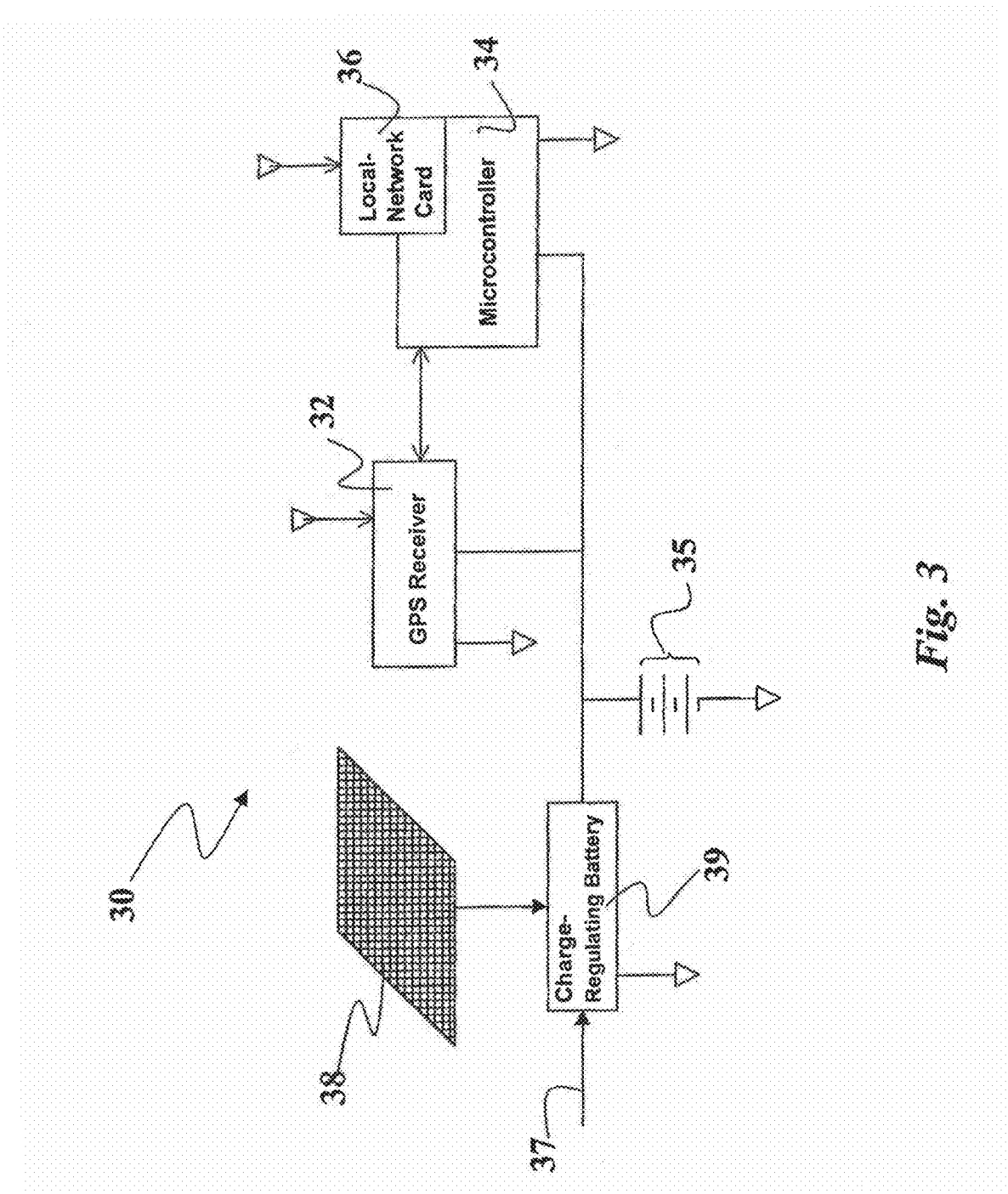
FIG. 3 shows an example of architecture of a measurement station.

The measurement system according to the present invention is based upon a set of measurement stations 30 that are completely autonomous. The block diagram of the basic architecture of a measurement station 30 is indicated in FIG. 3. The core of the station 30 is represented by a GPS receiver 32, which is a receiver capable of tracking the code and the phase of the carrier of the signals transmitted only on the frequency of the carrier L1.

A local micro-controller 34 controls the physical communications between the GPS receiver 32 and a radio-frequency unit, defines the communication protocol, and controls operation of the GPS receiver 32.

The micro-controller 34 is interfaced to a local-network card 36, which functions as point of access to the local network LAN, or else to a point-to-point radio connection, operating in the same frequency band, if a long-distance communication is required.

The supply to the station 30 is made through the main-distribution network 37 (220 Vac, 50 Hz) or using an array of solar cells 38 by means of a charge-regulating battery 39.

Accumulators 35 are used for providing, in the worst case, a continuous supply for a period of forty-eight hours, in the case of adverse weather conditions.

Figure 4:
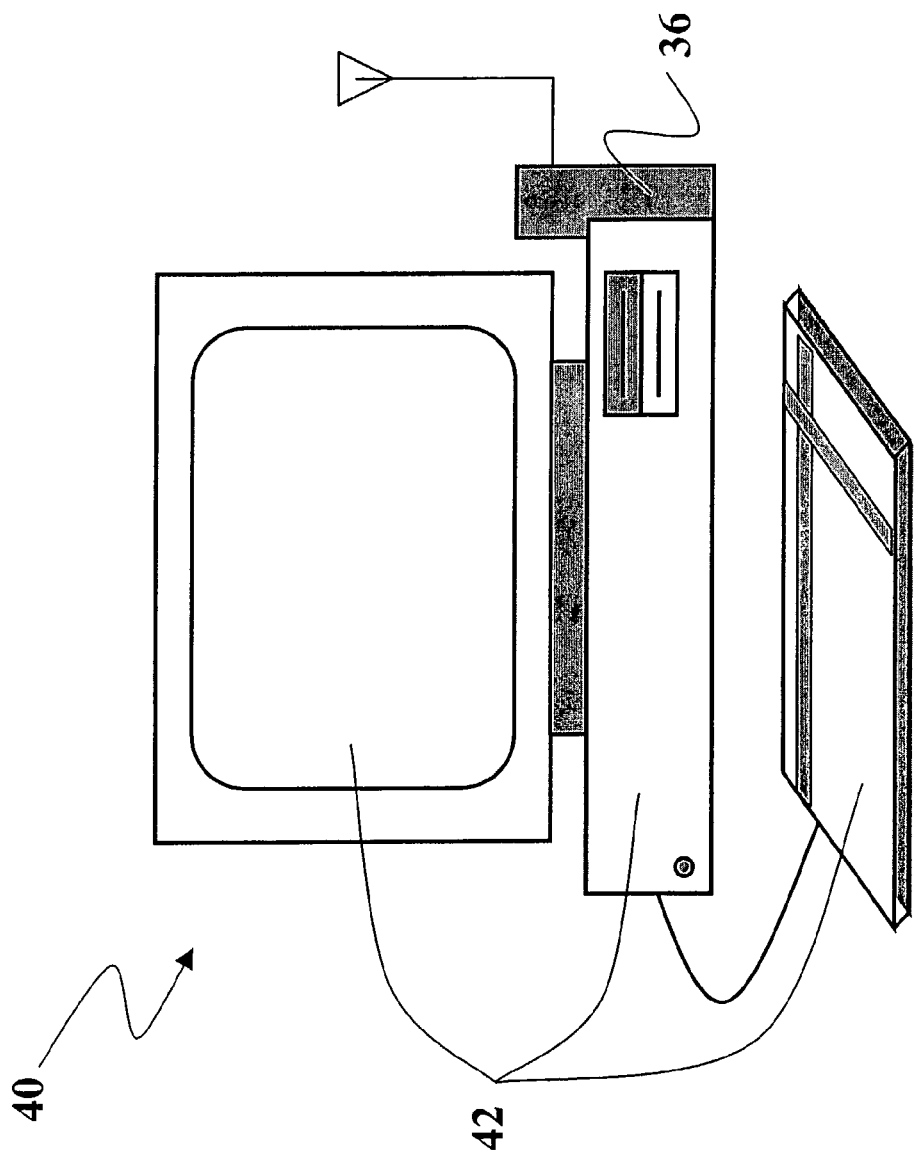
FIG. 4 shows in particular an example of architecture of a base station.

The base station 40 is developed around a commercially available processor 42 (as illustrated in FIG. 4); the base station 40 receives the data from the measurement stations 30 arrayed in field through radio-frequency receivers or transceivers for wireless local area networks (WLANs). The base station 40 stores the raw data, processes the measurements for obtaining accurate values for the baselines with respect to one or more stations 30, and displays and stores the results.

Since both the raw data and the data processed are stored, they can be easily re-used for carrying out any post-processing, whilst the system maintains the intrinsic capacity of working in real time.

In the method of construction of the network, the first operation is that of installing the measurement stations 30 and the base station 40. After the array of stations 30 has been positioned, and the communications with the base station 40 have been verified, initialization of the network must be performed. This operation has the effect of:

referencing in a reciprocal way each station 30 to a reference station 50 chosen in the network; all the corrections of the antennas are calculated as displacements with respect to the reference co-ordinates generated during the first operation of initialization;

if the reference station 50 of the network is in an absolute geo-referenced position, then the network in itself is absolutely referenced.

The initial solution is obtained by gathering the data from the stations 30; generally a reception of data of 10-20 minutes is sufficient for calculating a first solution. The data gathered are post-processed using a commercially available program. The initial co-ordinates are entered in a configuration-data file, together with the geometry of the network (in order to define which baselines are to be resolved and with respect to which reference stations).

After this initial investigation, the network is ready to function in real time, and no further external intervention by the operator is envisaged. Raw data and data processed in real time are displayed and stored in the base station.

The speed of calculation of the solution is currently 1 Hz, but can be made faster if necessary, for example 5 or 10 Hz. This limitation is not connected to the processing time, but is only linked to the capacity of the GPS receivers 32 chosen.

The propagation multiple paths (which influence both the measurements on the code and the measurements on the phase of the carrier) are a cause of errors in the solution that are repeated on a daily basis, with an interval of correlation of exactly one sideral day, which is equal to twice the orbital period of the GPS satellites (each GPS satellite presents exactly in the same position to an observer fixed on the Earth, but 3'56" in advance every day). Consequently, a solution for mitigating the errors due to the multiple paths is that of deriving a function of calibration for the daily effect of the multiple paths. This can be obtained using the same data provided by the system during the period of one or more days. These curves are repeatable and can be applied as calibrations in the calculation of the displacements. Currently, these corrections are made during the post-processing for experimental convenience, but can be processed in real time.

Applying the calibration curves of the multiple paths the mean square errors improve, being typically reduced to around 3-4 millimeters in the direction East, to 5 millimeters in the direction North, and to approximately 9-10 millimeters in the vertical direction.

The above values are found to be close to the theoretical limits for this kind of receivers and not very far from the best results obtained by two-frequency professional receivers.

Of course, without prejudice to the principle of the invention, the details of construction and the embodiments may vary widely with respect to what is described and illustrated herein purely by way of example, without thereby departing from the scope of the present invention.

The principles and the techniques described and used in the monitoring and measurement system proposed herein, and based upon the reception of GPS signals, are to be considered as extending to the use of other existing satellite systems (Glonass, EGNOS, WAAS, and others) or second-generation GNSS systems (Galileo).

The invention claimed is:

1. A measurement system for applications of monitoring and surveying based upon signals transmitted by a GPS system comprising:

a plurality of measurement stations each equipped with at least one GPS receiver and a related antenna, wherein said at least one GPS receiver is a receiver that works on a single carrier;

one or more base stations for the reception and processing of measurements made by said plurality of measurement stations; and a network of communication between said one or more stations;

said one or more base stations configured for performing after installation of said plurality of measurement stations and said one or more base stations an initialization of the network comprising the steps of:

gathering GPS data from said plurality of measurement stations;

post-processing said gathered data in order to calculate a-priori data of the nominal position of said antennas;

generating network geometry data by splitting said measurement stations into triangular sub-networks in which each vertex of a triangle contains a station;

entering said a-priori data and said network geometry data into a configuration file; and said one or more base stations being configured for calculating the length of the baselines, which join the measurement stations, by means of the double differences, and for executing in real time a calculation of a solution based upon corrections of the antenna positions as displacements with respect to said a-priori data entered in said configuration file.

2. The system according to claim 1, wherein said measurement stations are equipped with:

a micro-controller;

a local-network card; and a point-to-point radio connection.

3. The system according to claim 2, wherein that said measurement stations comprise:

a supply coming from a main distribution; and a supply with an array of solar cells.

4. The system according to claim 1, wherein the base station is configured to utilize in the calculation of the solution a method of correction of the multiple propagation paths based upon calibration curves with daily periodicity obtained from the same measurement data of the system.

5. The system according to claim 1, further comprising means for updating of the nominal position of said antennas with a linear estimator and an associated time constant of duration longer than that of phenomena under examination.

* * * * *